(12) United States Patent
Kelly (10) Patent No.: US 11,216,653 B2
(45) Date of Patent: Jan. 4, 2022

(54) AUTOMATED COLLECTION AND CORRELATION OF REVIEWER RESPONSE TO TIME-BASED MEDIA

(71) Applicant: Avid Technology, Inc., Burlington, MA (US)

(72) Inventor: Todd T. Kelly, New York, NY (US)

(73) Assignee: AVIO TECHNOLOGY, INC., Burlington, MA (US)

( * ) Notice: Subject to any disclaimer, the term of this patent is extended or adjusted under 35 U.S.C. 154(b) by 109 days.

(21) Appl. No.: 16/684,724

(22) Filed: Nov. 15, 2019

(65) Prior Publication Data

US 2021/0150190 A1    May 20, 2021

(51) Int. Cl.
*G06K 9/00* (2006.01)
*G06K 9/62* (2006.01)

(52) U.S. Cl.
CPC ..... *G06K 9/00315* (2013.01); *G06K 9/00261* (2013.01); *G06K 9/00335* (2013.01); *G06K 9/6263* (2013.01)

(58) Field of Classification Search
None
See application file for complete search history.

(56) References Cited

U.S. PATENT DOCUMENTS

| | | | |
|---|---|---|---|
| 6,585,521 B1 * | 7/2003 | Obrador | G09B 23/28 369/27.01 |
| 8,462,996 B2 * | 6/2013 | Moon | G06K 9/00315 382/118 |
| 2003/0118974 A1 * | 6/2003 | Obrador | G09B 23/28 434/236 |
| 2008/0275830 A1 * | 11/2008 | Greig | G06K 9/00335 706/21 |
| 2011/0263946 A1 * | 10/2011 | el Kaliouby | G06K 9/00335 600/300 |
| 2012/0222057 A1 * | 8/2012 | Sadowsky | H04N 21/251 725/10 |
| 2014/0270483 A1 * | 9/2014 | Lucey | G06K 9/00302 382/154 |
| 2020/0134672 A1 * | 4/2020 | el Kaliouby | G06K 9/00845 |

(Continued)

OTHER PUBLICATIONS

Oberlo.com, YouTube Analytics, 10 Powerful YouTube Analytics to Help You Grow Your Channel, Thomas J. Law, Sep. 23, 2019, 32 pages.

(Continued)

*Primary Examiner* — Soo Shin
(74) *Attorney, Agent, or Firm* — Oliver Strimpel (57) ABSTRACT

The responses of reviewers while reviewing a media composition are captured automatically using imagery and/or audio of the reviewers. The captured information is analyzed to extract response characteristics, such as emotions elicited in reviewers by the media composition. The results of the analysis are synchronized with the composition and fed back to the editor, who may use the emotion response results to influence further editing of the composition. Media composition tools integrate a synchronized representation of reviewers' response characteristics within a timeline display of the composition within the tool's user interface. Emotional responses of individual reviewers or aggregated responses of groups of reviewers may be displayed on reviewer response characteristics tracks within the timeline display.

17 Claims, 5 Drawing Sheets

(56) References Cited

U.S. PATENT DOCUMENTS

2020/0314490 A1* 10/2020 el Kaliouby ..... H04N 21/25866
2021/0076002 A1* 3/2021 Peters .................... H04N 7/147

OTHER PUBLICATIONS

SocialMediaWeek.org, 4 Emotion Detection APIs You Need to Try Out, Aug. 22, 2017, 12 pages.
Affectiva, https://www.affectiva.com/emotion-ai-overview/, Emotion AI Overview, Sep. 13, 2017, 4 pages.
Amazon Rekognition, https://docs.aws.amazon.com/rekognition/latest/dg/API_Emotion.html 1/, Emotion, Jun. 27, 2016, one page.
Azure Media Services, Announcing face and emotion detection for Azure Media Analytics, Posted Apr. 20, 2015, 10 pages.
Content Lab, Real-time Emotion Detection with Azure Cognitive Services, Mar. 19, 2019, 15 pages.
Infoq.com/news/2018, EmoPy-Computer-Vision, Introducing EmoPy: An Open Source Toolkit for Facial Expression Recognition, Oct. 2018, 6 pages.
https://www.ncbi.nlm.nih.gov/pmc/articles/PMC4819543/, Facial expression, size, and clutter: Inferences from movie structure to emotion judgments and back, published online, Jan. 4, 2016, 21 pages.
Nordicapis.com, 20+ Emotion Recognition APIs That Will Leave You Impressed, and Concerned, Sep. 26, 2019, 17 pages.
Paralleldots.com, Facial Emotion Detection, 2019, 8 pages.
Purdy, Mark et al., The Risks of Using AI to Interpret Human Emotions, Nov. 18, 2019, 7 pages.

\* cited by examiner

AUTOMATED COLLECTION AND CORRELATION OF REVIEWER RESPONSE TO TIME-BASED MEDIA

BACKGROUND

The media creation process generally includes a review phase, when a composition that is being edited is shown to reviewers who provide feedback to the video editors, audio mixers, media producers, song writers, audio producers, and other parties who contribute to the media creation workflow. During the review phase, it is desirable to evaluate reactions to the composition from reviewers drawn from various demographics, including the originally targeted one. Reliable feedback from reviewers during media production is crucial, even for experienced media creators, since it may have a substantial impact on the eventual success of the composition with its intended audience.

Current review methods use test audiences who view (video) or listen (audio) to the composition and compile written notes as they play back the composition, often supplemented with a written questionnaire after playback is completed. The questionnaire results are compiled and provided to the production team, who may change the video or audio in light of the test audience questionnaire results.

Recording one's own watching and/or listening experience during playback can be intrusive and interfere with a reviewer's ability to become immersed in the composition, which may affect their emotional response to the composition. To mitigate this effect, it is preferable to wait until the reviewer has completed playback of the entire composition before soliciting feedback. However, this commonly results in the reviewer evaluating the overall composition, partly because they may preferentially recall and respond to the ending of the composition, and also because it is difficult for reviewers to specify an exact location within a time-based composition at which they experienced a reaction. As a result, current review methods often fail to provide feedback that is desired on a temporally granular level. Furthermore, the process relies on the reviewer's ability to be aware of their reactions, and to be able to capture them faithfully in written form.

Improvements in the reliability and convenience of media review are needed to help increase the quality and quantity of feedback that is provided to storytellers and media creators so as to increase the likelihood that their projects achieve the desired results.

SUMMARY

Imagery and audio of reviewer responses to time-based media compositions are captured and analyzed to determine reviewer media response characteristics, such their emotional reactions. The determined response characteristics are fed back to media editors within a synchronized timeline display of the media composition.

In general, in one aspect, a method of providing feedback to an editor of a time-based media composition comprises: enabling a reviewer to play back the time-based media composition; while the reviewer is playing back the time-based media composition, capturing imagery of a face of the reviewer; using an artificial intelligence-based system, analyzing the captured imagery to determine a time-based media response characteristic of the reviewer; synchronizing the media response characteristic of the reviewer with the time-based media composition; and enabling the editor to view a timeline representation of the time-based media composition, wherein the timeline includes a synchronized response track representing the time-based media response characteristic of the reviewer.

Various embodiments include one or more of the following features. The time-based media composition is reviewed by a plurality of reviewers and for each reviewer of the plurality of reviewers: enabling the reviewer to play back the time-based media composition; while the reviewer is playing back the time-based media composition, capturing imagery of a face of the reviewer; using an artificial intelligence-based system, analyzing the captured imagery to determine a time-based media response characteristic of the reviewer; synchronizing the time-based media response characteristic of the reviewer with the time-based media composition; and enabling the editor to view a timeline representation of the time-based media composition, wherein the timeline includes a plurality of synchronized response tracks, each synchronized response track representing the time-based media response characteristic of a corresponding one of the plurality of reviewers. The artificial intelligence-based system analyzes the captured imagery to determine a plurality of different media response characteristics of the reviewer and synchronizing each media response characteristic of the plurality of different media response characteristics with the time-based media composition; and enabling the editor to view a timeline representation of the time-based media composition, wherein the timeline includes a plurality of synchronized response tracks, each synchronized response track of the plurality of different synchronized response tracks representing a corresponding one of the plurality of the media response characteristics of the reviewer. The synchronized response track represents the media response characteristic as a graph indicating a time-based level to which the media response characteristic is determined to be present. A determination above a threshold confidence that the media response characteristic is present at a given temporal location is represented by a graphical indication corresponding to the media response characteristic at the given temporal location within the media response track. The media response characteristic is one or more of a level of attention of the reviewer and an emotion of reviewer. The emotion of the reviewer is one or more of happiness, sadness, surprise, fear, suspense, shock, horror, disgust, and calm. The time-based media composition is reviewed by a plurality of reviewers and for each reviewer of the plurality of reviewers: enabling the reviewer to play back the time-based media composition; while the reviewer is playing back the time-based media composition, capturing imagery of a face of the reviewer; using an artificial intelligence-based system, analyzing the captured imagery to determine a time-based media response characteristic of the reviewer; and synchronizing the time-based media response characteristic of the reviewer with the time-based media composition; aggregating the media response characteristics from the plurality of reviewers; and enabling the editor to view a timeline representation of the time-based media composition, wherein the timeline includes a synchronized response track representing the aggregate time-based media response. The plurality of reviewers is drawn from a specified demographic and the aggregate time-based media response characteristic is an average time-based media response for reviewers of the specified demographic. The specified demographic is an age group and/or an ethnicity. The editor is able to compare the time-based media response characteristic of the reviewer with a desired time-based media response characteristic for the time-based media composition. The editor is able to view a graphical representation of the desired time-based media response characteristic as a track within the timeline representation of the media composition that is synchronized with the timeline representation of the media composition. The time-based media response characteristic is an emotion of the reviewer comprising one or more of happiness, sadness, surprise, fear, suspense, shock, horror, and disgust.

In general, in another aspect, a computer program product comprises: a non-transitory computer-readable medium with computer-readable instructions encoded thereon, wherein the computer-readable instructions, when processed by a computer system instruct the computer system to perform a method of providing feedback to an editor of a time-based media composition, the method comprising: enabling a reviewer to play back the time-based media composition; while the reviewer is playing back the time-based media composition, capturing imagery of the reviewer, preferably including the user's face; using an artificial intelligence-based system, analyzing the captured imagery to determine a time-based media response characteristic of the reviewer; synchronizing the media response characteristic of the reviewer with the time-based media composition; and enabling the editor to view a timeline representation of the time-based media composition, wherein the timeline includes a synchronized response track representing the time-based media response characteristic of the reviewer.

In general in a further aspect, a system comprises: a memory for storing computer-readable instructions; and a processor connected to the memory, wherein the processor, when executing the computer-readable instructions, causes the system to perform a method providing feedback to an editor of a time-based media composition, the method comprising: enabling a reviewer to play back the time-based media composition; while the reviewer is playing back the time-based media composition, capturing imagery of the reviewer, preferably including the reviewer's face; using an artificial intelligence-based system, analyzing the captured imagery to determine a time-based media response characteristic of the reviewer; synchronizing the media response characteristic of the reviewer with the time-based media composition; and enabling the editor to view a timeline representation of the time-based media composition, wherein the timeline includes a synchronized response track representing the time-based media response characteristic of the reviewer.

DETAILED DESCRIPTION

Rather than relying on a conscious intervention by a person who is reviewing a media composition to report their responses to the composition, the methods described herein rely on the automatic capture of a reviewer's reactions to the composition. The captured information is analyzed to determine whether certain media response characteristics were elicited in the reviewer while the media composition was being reviewed. The media response characteristic may be an emotion that the AI-based system is able to detect in a facial expression of the reviewer. Other response characteristics include, but are not limited to a level of attention, interest, or engagement of the reviewer. The results of the analysis are synchronized with the composition and fed back to the editor. The editor may use the reviewer responses as feedback to inform further editing of the composition. This may include attempting to increase a certain type of response or decrease another type of response. For example, a marginal response to a frightening event may suggest that further editing is needed to ensure that the event elicits more fear in the viewer. A sad response to a happy event in the media composition may suggest the need to perform further editing to elicit the desired emotion. Emotion responses to time-based media compositions are described in detail herein, but the methods may be used to capture and determine other media response characteristics from reviewers, and to feed such response characteristics back to media editors and composers in an integrated fashion, as described below.

Figure 1:
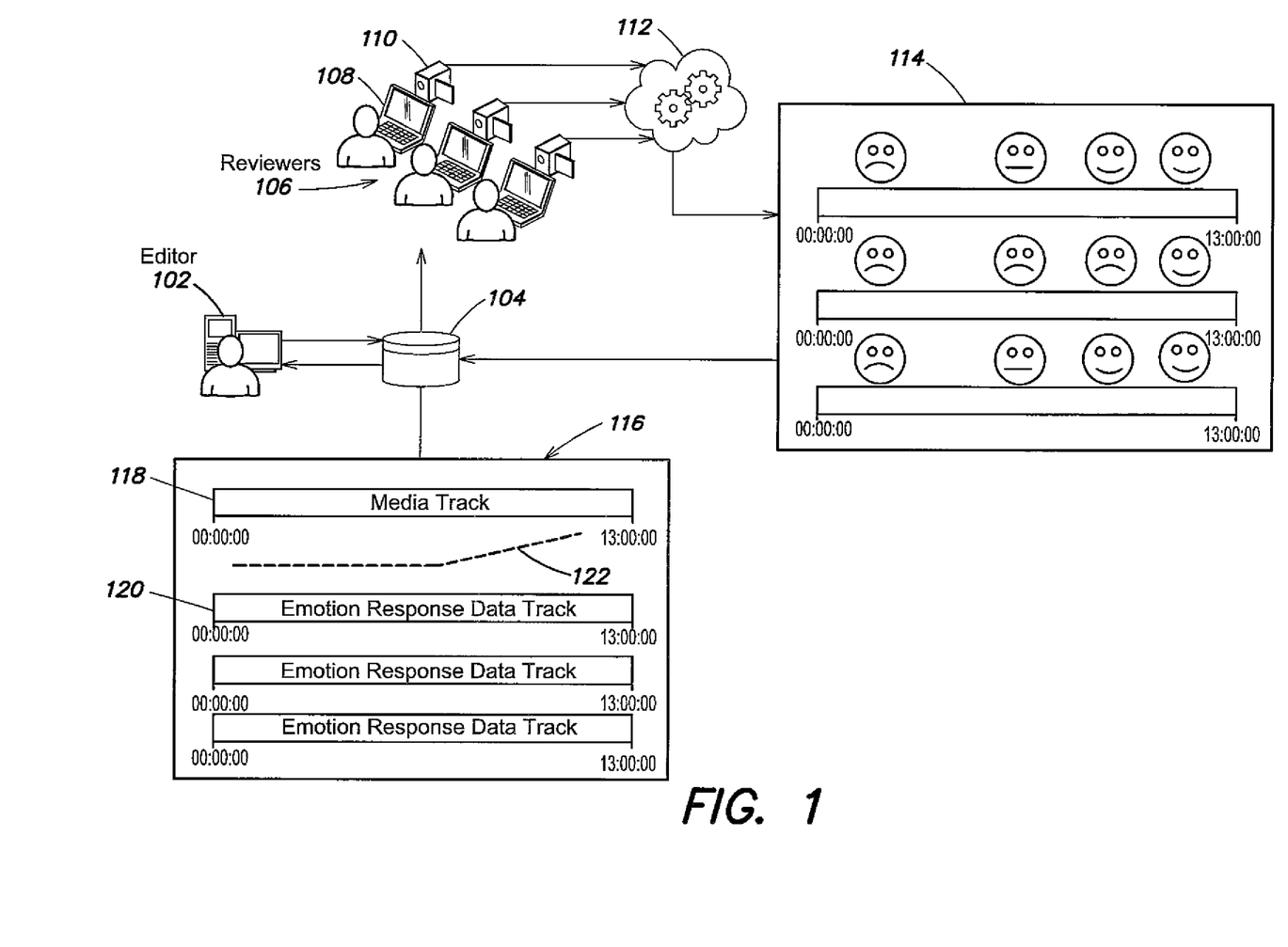
FIG. 1 is a high-level diagram illustrating an editorial workflow that incorporates the capture of the emotional response of media composition reviewers and the presentation of synchronized emotional response data to an editor.

FIG. 1 is a high-level diagram indicating a workflow for incorporating the automated capture of reviewers' emotion responses into the media composition process. An editor of a media composition uses media composition tool 102 to create a version of the composition for which reviewer response is desired. The media composition tool may be a non-linear video editing system, such as Media Composer® from Avid® Technology, Inc, Burlington, Mass. or a digital audio workstation for editing an audio composition, such as Pro Tools®, also from Avid Technology, Inc. The media composition is posted to shared storage 104. This storage may be located on the premises of the editor or may be hosted remotely. Storage system 104 may also include a database, such as media asset management system. One or more reviewers 106 then access the media composition from a reviewer station. Each reviewer station includes system 108 for playing back the media composition, such as a laptop computer, as well as one or more devices 110 for capturing and optionally storing one or more of video and audio of the reviewer. The devices may include an image capture device such as a video camera for recording still and/or moving imagery of the reviewer's face or of a larger portion of the user that includes arms and optionally the entire body, which enables gestures and full body movement to be captured in addition to facial expressions. Examples of such cameras include a camera integrated into a laptop, or a separate video camera mounted in front of the viewer. For capturing audio, a microphone is deployed, such as a microphone integrated into a laptop or into a separate video camera. A standalone microphone or lapel microphone on the reviewer may also be used.

The captured video and audio of the reviewer response to the media composition is sent to reviewer response recognition system 112. This system may be hosted in the cloud, or may be co-located with the reviewers, or with the media composition editor. The system may be based on a commercially available service, such as those that are trained using artificial intelligence and deep learning methods. Examples include the Microsoft® Azure® Face API, and the facial expression recognition toolkit from ThoughtWorks® named EmoPy. The reviewer response recognition system analyzes the reviewer imagery and audio to determine the presence of response characteristics in the reviewers. In the described embodiments, the systems analyze the video and audio of the reviewers to determine the degree of various classes of emotion in the reviewers, including but not limited to one or more of anger, disgust, fear, happiness, sadness, suspense, shock, horror, surprise and calm. When the media composition is video and/or audio, the results of the emotion recognition are time-based. In some implementations, emotion analysis may be performed for each frame or each audio sample of the captured reviewer response. Practical systems may integrate analysis results over a time period spanning multiple frames or samples and adjust the temporal granularity in response to the nature of the media being analyzed. This is discussed in more detail below. An iconic illustration of the results of the emotion recognition analysis is shown in box 114 as a timeline, with emotions of reviewers that have been recognized in the captured media shown at the temporal offset within the captured media of the reviewers at which they were detected.

The results of the emotion recognition analysis are sent to system 104 for storage, and optional addition to a media storage or media asset management system. System 104 also receives a copy of the media composition from the editor's media composition tool 102 which it stores in association with the emotion recognition results 114. The system also synchronizes the time-based emotion recognition results generated by emotion recognition system 112 with the media composition. This is achieved by matching frame numbers or time code, using the sample rate, or using other standard techniques. The stored media composition and synchronized emotion response data is indicated in diagrammatic timeline form in box 116, which includes one or more media tracks 118 of the media composition, and one or more temporally synchronized emotion response data tracks 120. The emotion response data may also be processed to generate a metric that may be useful as an indication of the emotion analysis, such as a time-based average emotion response as shown by graph 122, with the vertical scale indicating the degree of emotion response. User interfaces for integrating reviewer response data synchronized with a media composition within a media composition tool are discussed in more detail below. The media edit-review cycle is completed by sending the synchronized reviewer response data back to the editor's media composition tool 102, where the editor may perform additional editing with the benefit of reviewer response data. In various implementations, system 104 is hosted in the cloud or is hosted on the system hosting media composition tool 102. In some implementations, the editor posts the composition to be reviewed to a first storage system which is accessed by the reviewers and the results of the reviewer emotion analysis are sent to and stored in a second system hosting a database of media assets and their associated metadata, including the emotion response data.

A station used by the reviewer to review a media composition includes a means for playing back the composition. For a video composition, this requires a display for video output such as a monitor or screen, and loudspeakers or headphones for audio output, as well as a user interface which enables the reviewer to select the material to be reviewed, and to control the playback. In various implementations, the reviewer is able to initiate the playback, but is not provided with any other transport controls in order to more closely simulate the experience of an audience that consumes the composition in a linear fashion from start to finish. In other implementations, transport controls, such as start, stop, pause, rewind and fast-forward are provided. Data representing the playback location within the composition may be incorporated into the captured imagery in order to enable it to be synchronized with the composition. Alternatively, synchronization may rely on a clock that is shared between the playback system and the reviewer capture device. For reviewers using loudspeakers (as opposed to headphones), another synchronization method may be used in which the composition's audio output at the reviewer's station is picked up by a microphone in a reviewer capture device. This audio is matched with the source composition audio, enabling the recorded reviewer imagery to be synchronized with the composition. A camera is directed at the reviewer and captures imagery of at least the reviewer's face while the reviewer is watching and/or listening to the media composition. The camera may be a built-in camera of a laptop or an external camera. A microphone may also be connected to the reviewing system so as to capture any sounds produced by the reviewer, such as laughter or sobbing. In various implementations, imagery and audio from multiple reviewers may be captured by a single capture device.

The captured imagery as well as any audio that may be captured of the reviewer is sent to an emotion recognition system. This may be an AI-based engine which has been trained to detect facial emotion responses. When video captured from the reviewer spans a broader field of view than the face to include some or all of the reviewer's body, the emotion recognition system may also detect body language. For example, people who are engaged in a story may move less frequently, while those exhibiting a high degree of motion, may not be engaged at all. Surprise may be accompanied by a sudden motion such as a rapid movement of the head or a jump. The emotion recognition system analyzes the received media and determines what emotion responses are exhibited by the reviewer during the course of playback of the media. The detectable emotions may include anger, contempt, disgust, fear, happiness, sadness, and surprise. The emotion recognition system may be configured to look for specific emotions in specific types of composition, either upon automatic detection of the composition type, or in response to a specification of certain emotions of interest to an editor. For example, when a comedy is being reviewed, the media creator may be particularly interested in laughter, and detecting emotions that accompany successful humor, and/or a specific joke. The creator of a thriller may wish to focus the response system on manifestations of suspense, anxiety, and fear. When posting a composition for review, an editor may specify which emotions are of particular interest, causing the emotion-detection process to focus on searching for the specified emotion and analyzing the degree to which it is manifest in the captured imagery. When multiple emotions are detected, the system may output the emotion which is deemed to be the strongest, and/or an emotion that has been specified by the editor to be of special interest. In various implementations, an emotion is only indicated if it exceeds a defined confidence or intensity threshold. An intensity threshold may be pre-defined as a default in the AI-based emotion recognition system, or it may be tuned for a given composition or for a given reviewer to avoid noisy results. The confidence level of emotion detection may be stored and included in association with the emotion feedback to the editor, who may be able to adjust the threshold of the feedback within their media composition tool. In the absence of detection of a particular emotion, the system may categorize the user's response as neutral.

It may be desirable to correlate emotion response with demographic characteristics. To enable such analysis, the user may input such information in response to questions, and/or the captured imagery is analyzed to automatically determine one or more of the reviewer's skin color, eye type, and age. These may be identified by the AI-based emotion recognition engine referred to above, or by a different system that is specifically trained to detect such characteristics. Referring to FIG. 1, the demographic analysis may be performed by system 112, or by another system (not shown) in data communication with system 112. Ways of incorporating such information to inform an editor are described below.

The analysis is performed continuously over the duration of the composition that is being reviewed, and the results are keyed to the playback time (or offset) within the media. Special focus may be placed on temporal regions of particular interest to an editor, such those containing content for which an emotion response of a particular type is desired. For example, when an unexpected twist in a plot is revealed, an editor seeks to elicit surprise in the reviewer. Similarly, when a tragic event occurs, the editor may wish to evaluate whether the reviewer responds with sadness. At the times corresponding to such junctures in the media, which includes times spanning the expected human response delay times, the emotion recognition system may analyze the captured reviewer data at a finer temporal resolution to capture differences between emotion responses both before and immediately after the dramatic event. At the finest scale of granularity, the temporal resolution of the emotion analysis may correspond to the sampling frequency of the media itself, e.g., 24 times per second for media with a film frame rate. In some cases, e.g., for fast frame rate video, the maximum temporal resolution for the emotion analysis is determined by the frame rate of the camera capturing the imagery of the reviewer. Each frame may be separately analyzed and assigned an emotion, or a group of pictures may be analyzed to determine the predominant emotion manifest in the group together with a rate of change of that emotion as playback progresses through the group.

The way the captured imagery is analyzed may be determined in part by the specific emotion that is being detected. For example, laughter often occurs over an extended interval of up to a minute or several minutes, while surprise tends to be momentary. Thus, fine temporal resolution is more important when searching for surprise as compared to searching for laughter.

The same media may be played back to multiple reviewers while video and/or audio is captured of the reviewers. The emotion recognition system performs the analysis for each of the reviewers, and the results may be compiled in a database. The same set of reviewers may be used for different media compositions to control for reviewer variability. Statistical analysis may be used to determine an average response of a cohort of reviewers for a given composition. For emotion analysis results that are performed over appropriately short time intervals, a rate of change of emotion response may be determined. This may be valuable, for example, when a particular reviewer emotion, e.g., fear, appears to prevail for longer than desired, which signals to the editor the need for a change, such as light relief to release tension.

The emotion response data is provided to an editor. Most media are produced using media composition software in which the media is represented in a timeline format. This includes non-linear video editing applications and digital audio workstations. The emotion response data may be presented to an editor on an emotion response track in the timeline. The representation of the emotion response within the emotion response track may be in the form of a line graph, bar graph, icons representing users, emoticons representing emotions, or a heat map.

Figures 2A, 2B:
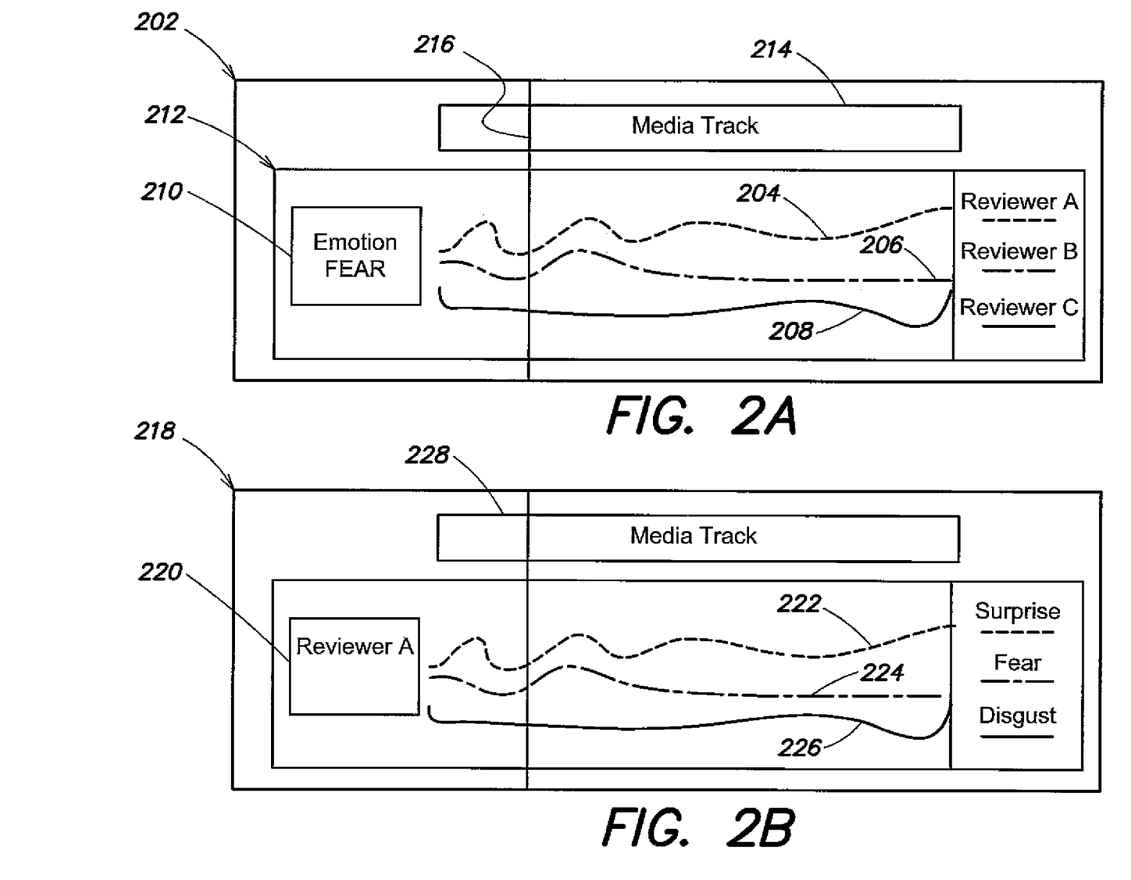
FIGS. 2A and 2B are diagrammatic graphical user interfaces of a media composition tool showing a timeline incorporating synchronized graphs of emotional responses of reviewers.

FIGS. 2A and 2B illustrate two timeline displays for a media composition tool that includes synchronized emotion response data. In emotion-focused timeline display 202, the responses of three reviewers are shown as graphs 204, 206, and 208 respectively for a given detected review emotion 210 within emotion feedback track or "lane" 212 within the media composition timeline. The graphs indicate the degree, or intensity of the detected emotion (e.g., fear) in each of reviewers A, B, and C. The emotion response tracks are temporally aligned with media track 214, which may be an audio track, a video track, or a computer-generated imagery track of the composition reviewed by the reviewers. In general, the timeline includes multiple media tracks, which are omitted from the figure for simplicity. The current playback location is indicated by bar 216, which moves to the right along the timeline during playback. This type of display enables the editor to compare the individual responses of each reviewer. In reviewer-focused display 218, the response of single reviewer 220 is shown as separate graphs 222, 224, and 226 to indicate the strength of each of the emotions identified for that user, synchronized with media track 228.

Figure 3A:
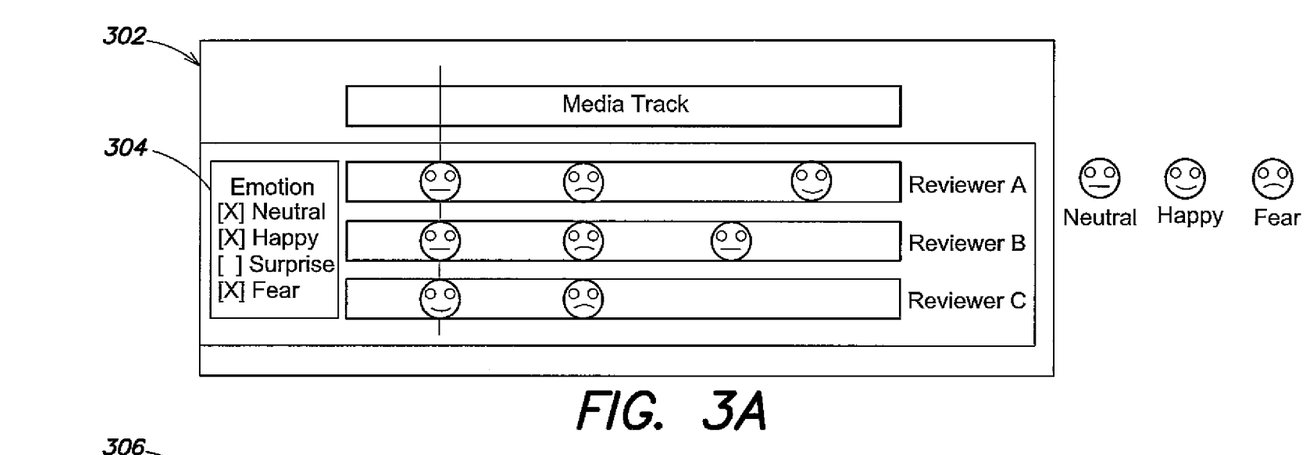
FIGS. 3A and 3B are diagrammatic graphical user interfaces of a media composition tool showing a timeline incorporating synchronized emotion response tracks that represent emotions and reviewers iconographically.
Figure 3B:
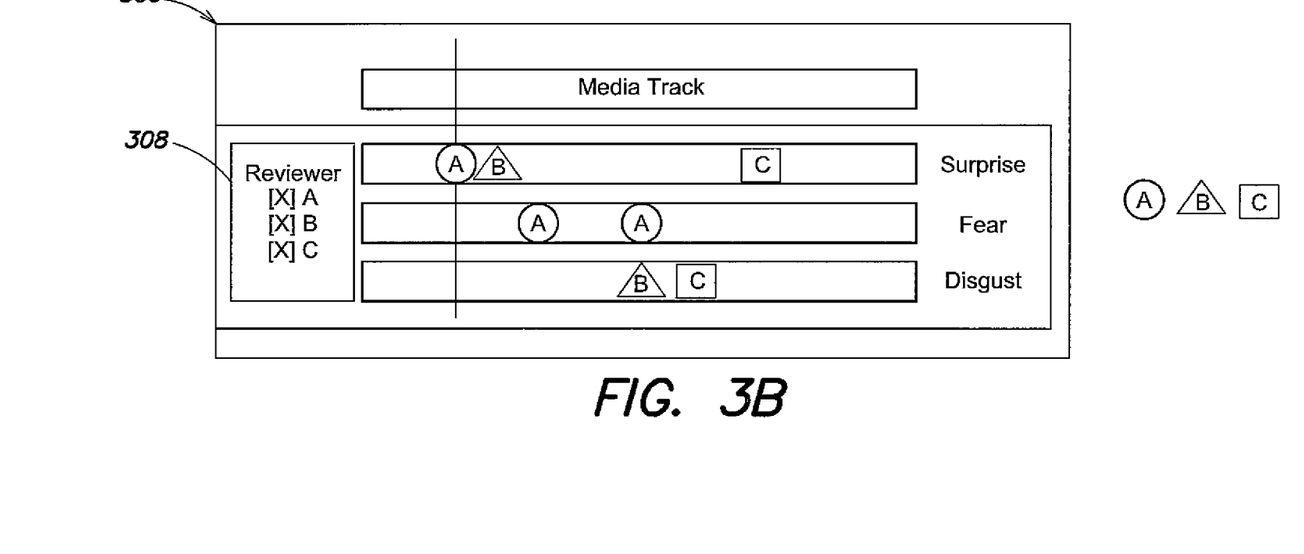

A further user interface based on the use of icons for reviewers and emotions is illustrated by the diagrammatic user interfaces shown in FIGS. 3A and 3B. In display 302, the emotions detected in each individual reviewer are shown in iconographic form on a separate track. The editor is able to specify which emotions are to be indicated on the tracks by selecting from list 304 of available emotions. In emotion-focused display 306, a separate track is assigned to each of the detected emotions, with icons on the tracks indicating the temporal locations at which the corresponding emotion is detected in each of the reviewers. The editor may use list 308 of available reviewers to specify the reviewers whose emotions are to be shown on the emotion tracks.

Figure 4:
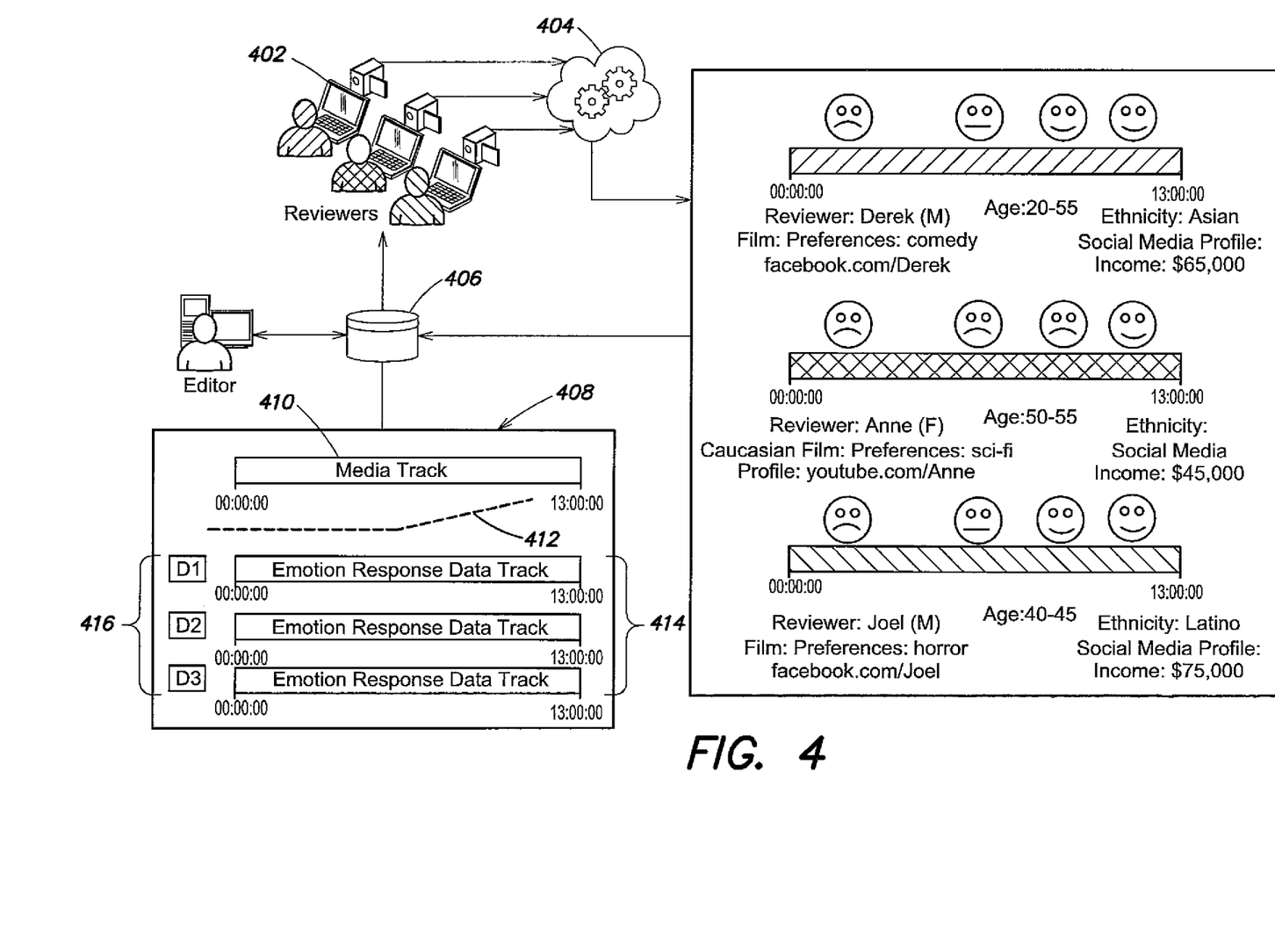
FIG. 4 is a high-level diagram illustrating an editorial workflow that incorporates the capture and use of demographic information for media composition reviewers whose emotion response is captured.

To support demographic analysis of the emotion reaction to a media composition, demographic information may be collected from the reviewers. As indicated above, such data may be collected automatically by analyzing the video and/or audio captured from reviewers and also by soliciting demographic information explicitly from the reviewers. The automatic methods may be able to determine gender, skin color, eye type, and age range, while the explicitly solicited demographic information may include age, ethnicity, data gathered via a social media profile, income level, as well as other information about reviewers of interest to the parties responsible for creating the media composition. FIG. 4 illustrates the inclusion of reviewer demographic information in the review process. The process proceeds as described above for FIG. 1, with the addition at reviewer stations 402 of the collection of demographic information. In addition to playing back the media composition, reviewers are asked to respond to one or more questions directed to the demographic factors of interest. The data is collected by system 404, which associates each reviewer's emotion response data with their demographic data. Additional demographic data obtained from automatic analysis of the captured video and audio may also be available to add to a reviewer's demographic profile. The AI-based extraction of emotion from the captured reviewer video and audio, the automatic determination of reviewer demographic information, and the management of the explicitly solicited demographic information may all be performed on system 404, or on separate systems, including systems hosted in the cloud. The emotion analysis results and demographic information are sent to system 406 where they are stored, synchronized with the media composition that is being reviewed, and optionally aggregated by reviewer or by one or more demographic parameters. A diagrammatic time-line representation of the data incorporating synchronized emotion response data as well as demographic data is shown in box 408. One or more media tracks 410 from the media composition are displayed in the usual time-line format, together with a representation of time-based emotion response obtained the reviewer data. In the example illustrated, graph 412 indicates an overall emotion level averaged over all reviewers with a vertical scale ranging from low emotion response (bottom) to high emotion response (top). For example, the graph may show an overall level of a happiness response, with the scale ranging from no detection of a happiness emotion (bottom) to very happy (top), or alternatively from very sad (bottom) to very happy (top). Three emotion response data tracks 414 indicate the emotion response of each of the reviewers with demographic information 416 displayed for each reviewer, enabling an editor to assess how the impact of the composition varies among individuals of different ethnicity, age, social media profile, and/or other demographic factors. In various embodiments, the emotion response data is aggregated for a given demographic and an average emotion response for a selected emotion for the given demographic is displayed in the timeline. For example, emotion response data tracks 414 may show emotion responses averaged over groups of reviewers aged 20-35, 35-50, and 50-65 respectively, or alternatively averaged over groups of users of Asian, Caucasian, and Latino ethnicities. In these embodiments, demographic information 416 characterizing the group of reviewers rather an individual reviewer is shown in association with the average emotion response tracks. The ability to assess the emotional impact of a composition on a given demographic may confirm that a composition is successfully impacting a desired target demographic, or conversely may suggest that it fails to resonate with its intended audience but unexpectedly reaches another audience group.

Figure 5:
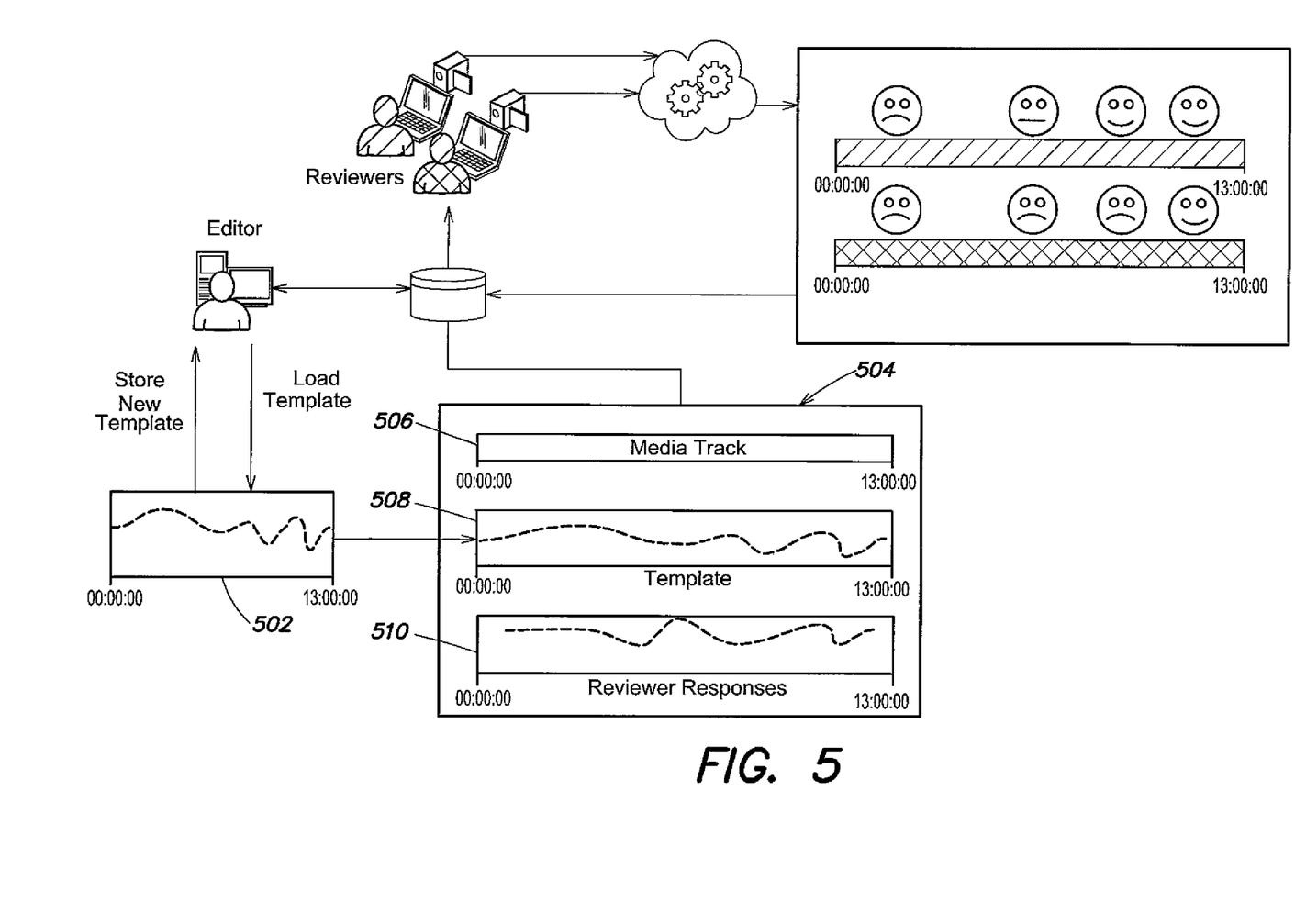
FIG. 5 is a high-level diagram illustrating an editorial workflow in which an editor is able to compare a composition's emotion response curve as determined from reviewers with a desired emotion response curve.

It is generally agreed that in successful stories the temporal development, or arc of emotion impact often adheres to certain patterns. Other story models recognize the presence of "beats" in a story, for example when tension builds to a climax and is then released through a comedic element. Using the methods and systems described herein, creators of media compositions are able to view the time-based development of the emotional impact of their compositions and compare it to a desired compositional, or story template. If the measured response differs significantly from the desired response, an editor may edit the composition to adjust the story arc to conform to the desired emotional impact profile more closely. In various embodiments, the system compares actual emotion response data with a desired template and suggests edits that move the composition closer towards the desired template and may also perform such edits automatically. FIG. 5 illustrates a workflow that involves the use of emotion templates. The editor loads emotion template 502. In the figure, the template is shown in diagrammatic form in which the degree to which an emotion is present, or an emotional intensity, is plotted as a graph with the value of the emotion intensity on the vertical axis and time on the horizontal axis. The emotion may be a specific emotion, such as fear or happiness, or may be an aggregate measure of the intensity of multiple detected emotions in the audience. The template is displayed in composition tool user interface 504, which includes one or more timeline tracks 506 of the media composition synchronized with emotion template 508 and actual reviewer emotion responses 510. Using such an interface, an editor is able to compare a composition's measured emotion arc with that of a desired template, identify significant differences, and use this information to guide subsequent editing decisions.

In each of the workflows described herein, the capture, analysis, and display of emotion response may be repeated with different edits of a media composition, helping editors to identify the editorial choices with the strongest desired responses. The iterations may be performed with the same reviewers to control for audience variability, or with different reviewers to mitigate the effects of potential bias or atypical responses associated with specific reviewers.

The methods described herein may be applied to media that is not time-based. For example, emotion responses may be collected automatically for still images, or computer-generated imagery.

Application areas include artistic video, films, and music compositions. The described methods may be deployed to help evaluate musical scores for a film or video. For such analysis, the response of reviewers to the same visual content for different accompanying music is compared. Other application areas include advertising and design where an emotional impact is desired.

The various components of the system described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), plasma displays, various stereoscopic displays including displays requiring viewer glasses and glasses-free displays, cathode ray tubes, video projection systems and other video output devices, printers, devices for communicating over a low or high bandwidth network, including network interface devices, cable modems, and storage devices such as disk, tape, or solid state media including flash memory. One or more input devices may be connected to the computer system. Example input devices include, but are not limited to, a keyboard, keypad, track ball, mouse, pen and tablet, touchscreen, camera, communication device, and data input devices. The invention is not limited to the particular input or output devices used in combination with the computer system or to those described herein.

The computer system may be a general-purpose computer system, which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data such as video data, still image data, or audio data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic, optical, or solid-state drives, which may include an array of local or network attached disks.

A system such as described herein may be implemented in software, hardware, firmware, or a combination of the three. The various elements of the system, either individually or in combination may be implemented as one or more computer program products in which computer program instructions are stored on a non-transitory computer readable medium for execution by a computer or transferred to a computer system via a connected local area or wide area network. Various steps of a process may be performed by a computer executing such computer program instructions. The computer system may be a multiprocessor computer system or may include multiple computers connected over a computer network or may be implemented in the cloud. The components described herein may be separate modules of a computer program, or may be separate computer programs, which may be operable on separate computers. The data produced by these components may be stored in a memory system or transmitted between computer systems by means of various communication media such as carrier signals.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method of providing feedback to an editor of a time-based media composition, wherein the editor is able to edit the time-based media composition using a media composition tool, the method comprising:
   enabling a reviewer to play back the time-based media composition;
   while the reviewer is playing back the time-based media composition, capturing imagery of a face of the reviewer;
   using an artificial intelligence-based system, analyzing the captured imagery to determine a time-based media response characteristic of the reviewer;
   synchronizing the time-based media response characteristic of the reviewer with the time-based media composition;
   receiving at the time-based media editing tool the synchronized media response characteristic of the reviewer;
   displaying within a user interface of the time-based media editing tool a timeline representation of the time-based media composition, wherein the timeline representation includes:
      a media track representing media of the time-based media composition; and
      a track representing the time-based media response characteristic of the reviewer that is synchronized with the media track; and
   wherein the displayed timeline representation enables the editor to edit the time-based media composition so as to elicit a media response characteristic that conforms to a predetermined response characteristic.

2. The method of claim 1, wherein:
   the time-based media composition is reviewed by a plurality of reviewers;
   for each reviewer of the plurality of reviewers:
      enabling the reviewer to play back the time-based media composition;
      while the reviewer is playing back the time-based media composition, capturing imagery of a face of the reviewer;
      using an artificial intelligence-based system, analyzing the captured imagery to determine a time-based media response characteristic of the reviewer;
      synchronizing the time-based media response characteristic of the reviewer with the time-based media composition; and
   wherein the displayed timeline representation includes a plurality of synchronized response tracks, each synchronized response track representing the time-based media response characteristic of a corresponding one of the plurality of reviewers.

3. The method of claim 1, wherein the artificial intelligence-based system analyzes the captured imagery to determine a plurality of different media response characteristics of the reviewer, and further comprising:
   synchronizing each media response characteristic of the plurality of different media response characteristics with the time-based media composition; and
   wherein the displayed timeline representation includes a plurality of synchronized response tracks, each synchronized response track of the plurality of different synchronized response tracks representing a corresponding one of the plurality of the media response characteristics of the reviewer.

4. The method of claim 1, wherein the track representing the time-based media response characteristic of the reviewer represents the media response characteristic as a graph indicating a time-based level to which the media response characteristic is determined to be present.

5. The method of claim 1, wherein a determination above a threshold confidence that the media response characteristic is present at a given temporal location is represented by a graphical indication corresponding to the media response characteristic at the given temporal location within the media response track.

6. The method of claim 1, wherein the media response characteristic is a level of attention of the reviewer.

7. The method of claim 1, wherein the media response characteristic is an emotion of reviewer.

8. The method of claim 7, wherein the emotion of the reviewer is one of surprise, fear, and disgust.

9. The method of claim 1, wherein:
the time-based media composition is reviewed by a plurality of reviewers;
for each reviewer of the plurality of reviewers:
  enabling the reviewer to play back the time-based media composition;
  while the reviewer is playing back the time-based media composition, capturing imagery of a face of the reviewer;
  using an artificial intelligence-based system, analyzing the captured imagery to determine a time-based media response characteristic of the reviewer; and
  synchronizing the time-based media response characteristic of the reviewer with the time-based media composition;
aggregating the media response characteristics from the plurality of reviewers; and
wherein the timeline representation includes a at least one synchronized response track representing the aggregated time-based media response characteristic.

10. The method of claim 9 wherein the plurality of reviewers is drawn from a specified demographic and the aggregate media response characteristic is an average time-based media response for reviewers of the specified demographic.

11. The method of claim 10, wherein the specified demographic is an age group.

12. The method of claim 10, wherein the specific demographic is an ethnicity.

13. The method of claim 1, further comprising enabling the editor to compare the time-based media response characteristic of the reviewer with the predetermined media response characteristic.

14. The method of claim 13, wherein the editor is able to view a graphical representation of the predetermined time-based media response characteristic as a track within the timeline representation of the media composition that is synchronized with the timeline representation of the media composition.

15. The method of claim 13, wherein the time-based media response characteristic is an emotion comprising one of surprise, fear, and disgust.

16. A computer program product comprising:
a non-transitory computer-readable medium with computer-readable instructions encoded thereon, wherein the computer-readable instructions, when processed by a computer system instruct the computer system to perform a method of providing feedback to an editor of a time-based media composition, wherein the editor is able to edit the time-based media composition using a media composition tool, the method comprising:
  enabling a reviewer to play back the time-based media composition;
  while the reviewer is playing back the time-based media composition, capturing imagery of a face of the reviewer;
  using an artificial intelligence-based system, analyzing the captured imagery to determine a time-based media response characteristic of the reviewer;
  synchronizing the time-based media response characteristic of the reviewer with the time-based media composition;
  receiving at the time-based media editing tool the synchronized media response characteristic of the reviewer;
  displaying within a user interface of the time-based media editing tool a timeline representation of the time-based media composition, wherein the timeline representation includes:
    a media track representing media of the time-based media composition; and
    a track representing the time-based media response characteristic of the reviewer that is synchronized with the media track; and
  wherein the displayed timeline representation enables the editor to edit the time-based media composition so as to elicit a media response characteristic that conforms to a predetermined response characteristic.

17. A system comprising:
a memory for storing computer-readable instructions; and
a processor connected to the memory, wherein the processor, when executing the computer-readable instructions, causes the system to perform a method providing feedback to an editor of a time-based media composition, wherein the editor is able to edit the time-based media composition using a media composition tool, the method comprising:
  enabling a reviewer to play back the time-based media composition;
  while the reviewer is playing back the time-based media composition, capturing imagery of a face of the reviewer;
  using an artificial intelligence-based system, analyzing the captured imagery to determine a time-based media response characteristic of the reviewer;
  synchronizing the time-based media response characteristic of the reviewer with the time-based media composition;
  receiving at the time-based media editing tool the synchronized media response characteristic of the reviewer;
  displaying within a user interface of the time-based media editing tool a timeline representation of the time-based media composition, wherein the timeline representation includes:
    a media track representing media of the time-based media composition; and
    a track representing the time-based media response characteristic of the reviewer that is synchronized with the media track; and
  wherein the displayed timeline representation enables the editor to edit the time-based media composition so as to elicit a media response characteristic that conforms to a predetermined response characteristic.

* * * * *